United States Patent
Jiang et al.

(10) Patent No.: US 12,088,640 B2
(45) Date of Patent: Sep. 10, 2024

(54) VIDEO MEDIA PLAYING METHOD AND APPARATUS

(71) Applicant: HUAWEI TECHNOLOGIES CO., LTD., Guangdong (CN)

(72) Inventors: Dehui Jiang, Shenzhen (CN); Jian Liu, Dongguan (CN); Shisheng Wu, Nanjing (CN); Dong Wang, Dongguan (CN); Wei Cui, Dongguan (CN); Hongxia Hao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 17/706,757

(22) Filed: Mar. 29, 2022

(65) Prior Publication Data
US 2022/0224731 A1 Jul. 14, 2022

Related U.S. Application Data

(63) Continuation of application No. PCT/CN2020/110896, filed on Aug. 24, 2020.

(30) Foreign Application Priority Data

Sep. 30, 2019 (CN) .......................... 201910940022.9

(51) Int. Cl.
*H04L 65/1069* (2022.01)
*H04L 65/1104* (2022.01)
*H04L 65/80* (2022.01)

(52) U.S. Cl.
CPC ...... *H04L 65/1069* (2013.01); *H04L 65/1104* (2022.05); *H04L 65/80* (2013.01)

(58) Field of Classification Search
CPC ... H04L 65/1069; H04L 65/1104; H04L 65/80
See application file for complete search history.

(56) References Cited

U.S. PATENT DOCUMENTS 8,059,656 B1  11/2011  Telikepalli et al.
8,554,931 B1 * 10/2013  Vossoughian ......... H04L 65/612
                                              379/142.05

(Continued)

FOREIGN PATENT DOCUMENTS

CN   102761917 A   10/2012
CN   105934972 A    9/2016

(Continued)

OTHER PUBLICATIONS

Huawei et al., "Support for video CAT service within audio call in TS 24.182",3GPP TSG-CT WG1 Meeting #109 C1-181542,Montreal (Canada), Feb. 26-Mar. 2, 2018, Total 16 Pages.

(Continued)

*Primary Examiner* — Kristie D Shingles
(74) *Attorney, Agent, or Firm* — HUAWEI TECHNOLOGIES CO., LTD.

(57) ABSTRACT

A video media playing method includes: A media server receives a call request message from originating UE, where the call request message includes first session description protocol (SDP) information of the originating UE; the media server receives a first response message returned by terminating user equipment (UE); the media server determines, based on the first response message, that the terminating UE does not support a resource reservation mechanism/procedure; the media server sends a second response message to the originating UE, where the second response message includes second SDP information used to respond to the first SDP information; and the media server performs video media negotiation with the originating UE through the resource reservation mechanism/procedure.

20 Claims, 5 Drawing Sheets

(56) References Cited

U.S. PATENT DOCUMENTS

| | | | | |
|---|---|---|---|---|
| 9,479,967 | B1* | 10/2016 | Smith | H04W 88/181 |
| 10,764,336 | B1* | 9/2020 | Raghunathan | H04L 65/1069 |
| 2011/0047282 | A1* | 2/2011 | Denman | H04L 65/765 |
| | | | | 709/231 |
| 2011/0276705 | A1* | 11/2011 | Stokking | H04L 65/1094 |
| | | | | 709/228 |
| 2012/0106326 | A1* | 5/2012 | Polk | H04L 47/72 |
| | | | | 370/437 |
| 2013/0185440 | A1* | 7/2013 | Blau | H04L 61/2528 |
| | | | | 709/227 |
| 2014/0219088 | A1* | 8/2014 | Oyman | H04N 21/23439 |
| | | | | 370/231 |
| 2015/0172349 | A1* | 6/2015 | Gonzalez De Langarica | |
| | | | | H04L 65/65 |
| | | | | 709/219 |
| 2017/0339740 | A1 | 11/2017 | Abichandani et al. | |

FOREIGN PATENT DOCUMENTS

| | | |
|---|---|---|
| CN | 106856469 A | 6/2017 |
| CN | 109905899 A | 6/2019 |
| GB | 2555147 A | 4/2018 |
| WO | 2012113237 A1 | 8/2012 |
| WO | 2018018892 A1 | 2/2018 |

OTHER PUBLICATIONS

G. Camarillo et al., "Early Media and Ringing Tone Generation in the Session Initiation Protocol (SIP)",Network Working Group, Request for Comments: 3960, Dec. 2004, total 13 pages.

G. Camarillo, Ed. et al., "Integration of Resource Management and Session Initiation Protocol (SIP)",Network Working Group, Request for Comments: 3312, Oct. 2002, total 30 pages.

3GPP TS 22.182 V15.0.0 (Jun. 2018)3rd Generation Partnership Project;Technical Specification Group Services and System Aspects;Customized Alerting Tones (CAT) Requirements; Stage 1(Release 15), total 14 pages.

3GPP TS 24.182 V16.1.0 (Sep. 2019)3rd Generation Partnership Project; Technical Specification Group Core Network and Terminals;IP Multimedia Subsystem (IMS) Customized Alerting Tones (CAT);Protocol specification(Release 16), total 158 pages.

3GPP TS 24.628 V16.0.0 (Sep. 2019)3rd Generation Partnership Project;Technical Specification Group Core Network and Terminals;Common Basic Communication procedures using IP Multimedia (IM)Core Network (CN) subsystem; Protocol specification (Release 16), total 60 pages.

* cited by examiner

VIDEO MEDIA PLAYING METHOD AND APPARATUS

CROSS-REFERENCE TO RELATED APPLICATIONS

This application is a continuation of International Application No. PCT/CN2020/110896, filed on Aug. 24, 2020, which claims priority to Chinese Patent Application No. 201910940022.9, filed on Sep. 30, 2019. The disclosures of the aforementioned applications are hereby incorporated by reference in their entireties.

TECHNICAL FIELD

This disclosure relates to the communications field, and in particular, to a video media playing method and an apparatus.

BACKGROUND

As voice over long term evolution (VoLTE) is introduced, voice call quality is significantly improved, and high-definition voice calls and video calls can be provided. With full application of video media services (for example, video ring back tone), users are more aware of changes brought by the VoLTE.

For example, originating user equipment (UE) initiates a call request to terminating UE. The originating UE may play a video while waiting for a response from the terminating UE, thereby improving user experience. UEs may be classified into a plurality of types of devices, such as a device supporting a resource reservation mechanism/procedure (i.e. "precondition") and a device not supporting precondition. In an existing solution, if originating UE supports precondition but terminating UE does not, the originating UE cannot play video media.

SUMMARY

This application provides a video media playing method and an apparatus to perform video media negotiation with originating UE through a resource reservation mechanism/procedure in a scenario in which terminating UE does not support the resource reservation mechanism/procedure, so that the originating UE can successfully play video media, thereby improving user experience.

According to a first aspect of this disclosure, a video media playing method is provided, including:
a media server receives a call request message from originating user equipment (UE), where the call request message includes first session description protocol (SDP) information of the originating UE; the media server receives a first response message returned by terminating user equipment (UE); the media server determines, based on the first response message, that the terminating UE does not support a resource reservation mechanism/procedure; the media server sends a second response message to the originating UE, where the second response message includes second SDP information, and the second SDP information is used to respond to the first SDP information; and the media server performs video media negotiation with the originating UE through the resource reservation mechanism/procedure.

In this implementation of this disclosure, after the terminating UE sends the first response message to the media server, the media server can determine that the terminating UE does not support precondition. The media server may generate the second response message including the second SDP information, to respond to the first SDP information included in the call request message. In addition, even if the terminating UE does not support precondition, the media server can perform video media negotiation with the originating UE through a precondition procedure, so that the originating UE can play video media, thereby improving user experience.

Optionally, in a possible implementation, that the media server performs video media negotiation with the originating UE through the resource reservation mechanism/procedure includes:
the media server sends a first update message to the originating UE, where the first update message includes third SDP information of video media; and the media server receives a third response message sent by the originating UE, where the third response message includes a result of video media negotiation between the originating UE and the media server.

In this implementation of this disclosure, the media server may send the first update message to the originating UE, so that the originating UE starts precondition. In addition, the media server may receive the third response message of the originating UE to complete video media negotiation between the originating UE and the media server, so that the originating UE can play the video media, thereby improving user experience.

Optionally, in a possible implementation, the SDP information of the video media includes audio description information of the video media and video description information of the video media. In this implementation of this disclosure, the SDP information of the video media may include the audio description information of the video media and the video description information of the video media, so that the originating UE may learn related information of the video media based on the SDP information of the video media, to start precondition and perform more accurate video media negotiation.

Optionally, in a possible implementation, a header field of the first update message includes indication information indicating the originating UE to perform video media negotiation through the resource reservation mechanism/procedure, and the SDP information of the video media includes a quality of service (QoS) parameter of the video media. In this implementation of this disclosure, the header field of the first update message may include the indication information, so that the originating UE may start a precondition procedure, and further determine information about a network resource for the video media based on the QoS parameter of the video media that is included in the SDP information of the video media.

Optionally, in a possible implementation, the second response message indicates that the terminating UE does not support the resource reservation mechanism/procedure. In this implementation of this disclosure, the media server may notify, by using the second response message, the originating UE that the terminating UE does not support precondition.

Optionally, in a possible implementation, the third response message indicates that the originating UE has completed resource reservation for the video media. In this implementation of this disclosure, the originating UE may notify, by using the third response message, the media server that the originating UE has completed resource reservation, so as to complete precondition procedure.

Optionally, in a possible implementation, after the media server receives the third response message sent by the originating UE, the method further includes:

the media server receives a second update message sent by the originating UE, where the second update message indicates that the originating UE has completed resource reservation for the video media.

In this implementation of this disclosure, after completing resource reservation for the video media, the originating UE further sends the second update message to the media server, to notify the media server that the originating UE has completed resource reservation. In this way, media stream data of the video media may be transmitted between the media server and the originating UE by using a reserved resource, so that the originating UE can play the video media, thereby improving user experience.

Optionally, in a possible implementation, after the media server receives the second update message sent by the originating UE, the method further includes:

the media server sends a fourth response message to the originating UE, where the fourth response message indicates that the media server has completed resource reservation. In this implementation of this disclosure, the originating UE may notify, by using the fourth response message, the media server that the originating UE has completed resource reservation, so as to complete precondition procedure.

Optionally, in a possible implementation, before the media server sends the first update message to the originating UE, the method further includes:

the media server performs resource reservation for the video media; where the first update message indicates that the media server has completed resource reservation for the video media.

In this implementation of this disclosure, the media server may notify, by using the first update message, the originating UE that the media server has completed resource reservation.

Optionally, in a possible implementation, after the media server determines that the terminating UE does not support precondition, the media server may further perform resource reservation to reserve a resource for the video media.

Optionally, in a possible implementation, after the media server receives the second update message sent by the originating UE, the method further includes:

the media server sends media stream data of the video media to the originating UE, so that the originating UE plays the media stream data of the video media.

Therefore, after the media server and the originating UE both complete resource reservation for the video media, they may transmit the media stream data of the video media by using the reserved resource, so that the originating UE can receive and play the media stream data of the video media. In this way, the originating UE can normally play the video media even in a scenario in which the terminating UE does not support precondition, thereby improving user experience.

In a possible implementation, the first response message is a 180 message, and that the media server determines, based on the first response message, that the terminating UE does not support a resource reservation mechanism/procedure is performed based on determining that no 183 message is received from the terminating UE by the media server.

In this implementation of this disclosure, the first response message may be a 180 message indicating that the terminating UE has rung, and no 183 message from the terminating UE is received before the 180 message. In this case, the media server can determine that the terminating UE does not support precondition.

According to a second aspect of this disclosure, a video media playing method is provided, including: a media server receives a call request message from originating UE, where the call request message includes first session description protocol (SDP) information of the originating UE; the media server receives a first response message returned by terminating user equipment (UE), where the first response message may be a first session progress message; the media server determines, based on the first session progress message, that the terminating UE does not support a resource reservation mechanism/procedure; the media server sends a second response message to the originating UE, where the second response message may be a second session progress message, the second session progress message includes SDP information of the terminating UE, the second session progress message is obtained by the media server based on the first session progress message, and the SDP information of the terminating UE is used to respond to the first SDP information; and the media server performs video media negotiation with the originating UE through the resource reservation mechanism/procedure.

In this implementation of this disclosure, after the terminating UE replies with the first session progress message, the media server can determine, based on the first session progress message, that the terminating UE does not support precondition, and send the second session progress message to the originating UE, to respond to the first SDP information of the originating UE. Even if the terminating UE does not support precondition, the media server can perform video media negotiation with the originating UE through a precondition procedure, so that the originating UE can play video media, thereby improving user experience.

Optionally, in a possible implementation, that the media server performs video media negotiation with the originating UE through the resource reservation mechanism/procedure includes:

the media server sends a first update message to the originating UE, where the first update message includes third SDP information of video media; and the media server receives a third response message sent by the originating UE, where the third response message includes a result of video media negotiation between the originating UE and the media server.

The media server sends the first update message that includes the third SDP information of the video media to the originating UE. Then, the media server receives the third response message sent by the originating UE. The third response message includes the result of video media negotiation between the originating UE and the media server. Therefore, even if the terminating UE does not support precondition, the media server can perform video media negotiation with the originating UE, so that the originating UE can play the video media, thereby improving user experience.

Optionally, in a possible implementation, the first session progress message may be a 183 message, and the second session progress message may also be a 183 message.

Optionally, in a possible implementation, the first session progress message indicates that the terminating UE does not support the resource reservation mechanism/procedure, and/or the second session progress message indicates that the terminating UE does not support the resource reservation mechanism/procedure.

Optionally, in a possible implementation, the first update message is an UPDATE message, and the second update message is also an UPDATE message.

Optionally, before the media server sends the first update message to the originating UE, the media server further receives a 180 message sent by the terminating UE, where the 180 message indicates that the terminating UE rung.

Optionally, in a possible implementation, the SDP information of the video media includes audio description information of the video media and video description information of the video media. In this implementation of this disclosure, the SDP information of the video media may include the audio description information of the video media and the video description information of the video media, so that the originating UE may learn related information of the video media based on the SDP information of the video media, to start precondition and perform more accurate video media negotiation.

Optionally, in a possible implementation, a header field of the first update message includes information about a resource reserved by the media server, and the SDP information of the video media includes a quality of service (QoS) parameter of the video media. In this implementation of this disclosure, the header field of the first update message may include indication information, so that the originating UE may start a precondition procedure, and further determine information about a network resource for the video media based on the QoS parameter of the video media that is included in the SDP information of the video media.

Optionally, in a possible implementation, the third response message indicates that the originating UE has completed resource reservation for the video media. In this implementation of this disclosure, the originating UE may notify, by using the third response message, the media server that the originating UE has completed resource reservation, so as to complete the precondition procedure.

Optionally, in a possible implementation, after the media server receives the third response message sent by the originating UE, the method further includes:
    the media server receives a second update message sent by the originating UE, where the second update message indicates that the originating UE has completed resource reservation for the video media.

In this implementation of this disclosure, after completing resource reservation for the video media, the originating UE further sends the second update message to the media server, to notify the media server that the originating UE has completed resource reservation. In this way, media stream data of the video media may be transmitted between the media server and the originating UE by using a reserved resource, so that the originating UE can play the video media, thereby improving user experience.

Optionally, in a possible implementation, after the media server receives the second update message sent by the originating UE, the method further includes:
    the media server sends a fourth response message to the originating UE, where the fourth response message indicates that the media server has completed resource reservation. In this implementation of this disclosure, the originating UE may notify, by using the fourth response message, the media server that the originating UE has completed resource reservation, so as to complete precondition procedure.

Optionally, in a possible implementation, before the media server sends the first update message to the originating UE, the method further includes:
    the media server performs resource reservation for the video media; where the first update message indicates that the media server has completed resource reservation.

In this implementation of this disclosure, the media server may notify, by using the first update message, the originating UE that the media server has completed resource reservation.

Optionally, in a possible implementation, after the media server receives the second update message sent by the originating UE, the method further includes:
    the media server sends media stream data of the video media to the originating UE, so that the originating UE plays the media stream data of the video media.

Therefore, after the media server and the originating UE both complete resource reservation for the video media, they may transmit the media stream data of the video media by using the reserved resource, so that the originating UE can receive and play the media stream data of the video media. In this way, the originating UE can normally play the video media even in a scenario in which the terminating UE does not support precondition, thereby improving user experience.

According to a third aspect of this disclosure, a media server is provided. The media server has a function of implementing the video media playing method in the first aspect. The function may be implemented by hardware, or may be implemented by hardware executing corresponding software. The hardware or the software includes one or more modules corresponding to the function.

According to a fourth aspect of this disclosure, a media server is provided. The media server has a function of implementing the video media playing method in the second aspect. The function may be implemented by hardware, or may be implemented by hardware executing corresponding software. The hardware or the software includes one or more modules corresponding to the function.

According to a fifth aspect of this disclosure, a media server is provided. The media server includes a processor and a transceiver, and optionally further includes a memory. The processor, the transceiver, and the memory communicate with each other by using an internal connection. The processor is configured to perform the method according to any one of the first aspect or the possible implementations of the first aspect. The transceiver is configured to receive control of the processor, and configured to perform data sending and receiving in the method according to any one of the first aspect or the possible implementations of the first aspect. The memory is configured to store instructions, and the instructions are invoked by the processor, to perform the method according to any one of the first aspect or the possible implementations of the first aspect.

According to a sixth aspect of this disclosure, a media server is provided. The media server includes a processor and a transceiver, and optionally further includes a memory. The processor, the transceiver, and the memory communicate with each other by using an internal connection. The processor is configured to perform the method according to any one of the second aspect or the possible implementations of the second aspect. The transceiver is configured to receive control of the processor, and configured to perform data sending and receiving in the method according to any one of the second aspect or the possible implementations of the second aspect. The memory is configured to store instructions, and the instructions are invoked by the processor, to perform the method according to any one of the second aspect or the possible implementations of the second aspect.

According to a seventh aspect of this disclosure, a computer-readable storage medium is provided, and is configured to store a computer program. The computer program includes instructions used to perform the method according to any one of the first aspect or the possible implementations of the first aspect.

According to an eighth aspect of this disclosure, a computer-readable storage medium is provided, and is configured to store a computer program. The computer program includes instructions used to perform the method according to any one of the second aspect or the possible implementations of the second aspect.

According to a ninth aspect of this disclosure, a computer program is provided. The computer program includes instructions used to perform the method according to any one of the first aspect or the possible implementations of the first aspect.

According to a tenth aspect of this disclosure, a computer program is provided. The computer program includes instructions used to perform the method according to any one of the second aspect or the possible implementations of the second aspect.

According to an eleventh aspect of this disclosure, a chip is provided. The chip includes a processing circuit and a transceiver interface. The transceiver interface may also be referred to as a communications interface or an input/output interface. Optionally, the chip further includes a memory. The processing circuit, the transceiver interface, and the memory communicate with each other by using an internal connection. The processing circuit is configured to perform the method according to any one of the first aspect or the possible implementations of the first aspect. The transceiver interface is configured to receive control of the processing circuit, and configured to perform signal sending and receiving in the method according to any one of the first aspect or the possible implementations of the first aspect. The memory is configured to store instructions, and the instructions are invoked by the processing circuit, to perform the method according to any one of the first aspect or the possible implementations of the first aspect.

According to a twelfth aspect of this disclosure, a chip is provided. The chip includes a processing circuit and a transceiver interface. The transceiver interface may also be referred to as a communications interface or an input/output interface. Optionally, the chip further includes a memory. The processing circuit, the transceiver interface, and the memory communicate with each other by using an internal connection. The processing circuit is configured to perform the method according to any one of the second aspect or the possible implementations of the second aspect. The transceiver interface is configured to receive control of the processing circuit, and configured to perform signal sending and receiving in the method according to any one of the second aspect or the possible implementations of the second aspect. The memory is configured to store instructions, and the instructions are invoked by the processing circuit, to perform the method according to any one of the second aspect or the possible implementations of the second aspect.

According to a thirteenth aspect of this disclosure, a communications system is provided. The communications system includes a media server and a call control function device. The media server may be the media server according to the third aspect or the fourth aspect. The call control function device is configured to forward a message between the media server and originating UE.

Optionally, in some possible implementations, the communications system may further include a media resource function (MRF) server. The MRF server is configured to receive an indication of the media server, and send a video media stream to the originating UE based on the indication.

Therefore, in this disclosure, after receiving a call request message from the originating UE, the media server may forward the call request message to terminating UE. The call request message includes first SDP information of the originating UE. The media server receives a first response message returned by the terminating UE in response to the first SDP information. The media server can determine, based on the first response message, that the terminating UE does not support precondition. Then, the media server may perform video media negotiation with the originating UE through a precondition procedure. Therefore, even if the terminating UE does not support precondition, the media server can perform video media negotiation with the originating UE, so that the originating UE can play video media, thereby improving user experience.

DESCRIPTION OF EMBODIMENTS

This disclosure provides a video media playing method and an apparatus to perform video media negotiation with originating UE through a resource reservation mechanism/procedure in a scenario in which terminating UE does not support the resource reservation mechanism/procedure, so that the originating UE can successfully play video media, thereby improving user experience.

The video media playing method provided in this disclosure may be applied to various communications systems. For example, the various communications systems may be a 5G system, a long term evolution (LTE) system, a global system for mobile communications (GSM) or a code division multiple access (CDMA) network, and a wideband code division multiple access (WCDMA) network, and may further be future communications networks, for example, a 6G network and a 7G network. Names of related network elements are not limited, and may be replaced with names of network elements that have same or similar functions in the future communications networks. This is not limited in this disclosure.

Figure 1:
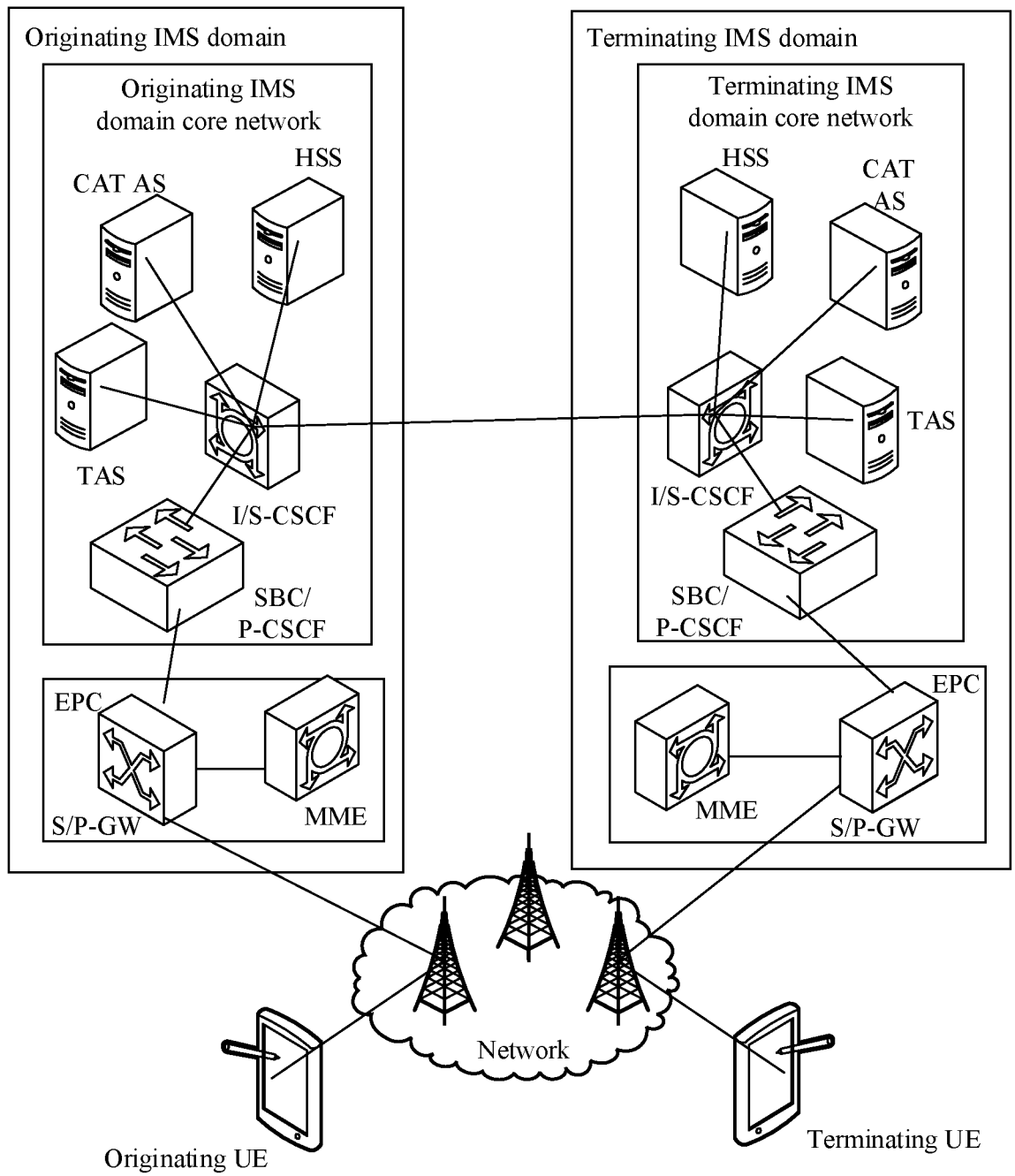
FIG. 1 is a schematic diagram of a system architecture applied to an embodiment of this disclosure.

For example, FIG. 1 may show a communications system to which the video media playing method provided in this disclosure is applied. The communications system may include but is not limited to: originating UE, a base station, an originating internet protocol (IP) multimedia subsystem (IMS) domain network, and a terminating IMS domain network.

The originating UE is configured to provide voice/data connectivity for a user, for example, may include a handheld device with a wireless connection function or a vehicle-mounted device, or may include an intelligent mobile phone, a mobile station (MS), a mobile terminal (MT), or the like. The originating UE may also be referred to as a terminal device below. The originating UE may be deployed on land, including an indoor environment or an outdoor environment, or may be handheld or vehicle-mounted; or may be deployed on a water surface (for example, a ship); or may be further deployed in the air (for example, an airplane, a balloon, a satellite, or the like). The originating UE may be a terminal device that can access a mobile network, a mobile phone, a tablet computer (e.g. a pad), a computer with a wireless transceiver function, a virtual reality (VR) terminal, an augmented reality (AR) terminal, a wireless terminal in industrial control (industrial control), a wireless terminal in self driving, a wireless terminal in telemedicine (i.e. remote medical), a wireless terminal in a smart grid, a wireless terminal in transportation safety, a wireless terminal in a smart city, a wireless terminal in a smart home, or the like.

For the terminating UE, refer to the related description of the originating UE.

The base station is configured to implement a wireless physical layer function, resource scheduling, radio resource management, radio access control, a mobility management function, and the like. The base station may be a device having a central control function, such as a macro base station, a micro base station, a hotspot (e.g. a pico base station), a home base station (e.g. a femto base station), a transmission point (TP), a relay, and an access point (AP). The base station may be an access network device such as an eNodeB (eNB) in long term evolution (LTE) or a gNodeB (gNB) in New Radio (NR).

The originating UE may access a base station corresponding to the originating UE, and the terminating UE may access a base station corresponding to the terminating UE.

Architectures of the originating IMS domain network and the terminating IMS domain network may be the same or different.

For example, as shown in FIG. 1, the architecture of the originating IMS domain network is the same as that of the terminating IMS domain network. The originating IMS domain network and the terminating IMS domain network each may include an IMS domain core network and an evolved packet core (EPC). The IMS domain core network includes a serving-call session control function (S-CSCF), an interrogating-call session control function (I-CSCF), a proxy-call session control function (P-CSCF), a home subscriber server (HSS), a session border controller (SBC), and several dedicated servers such as a telephony application server (TAS). The I-CSCF and the S-CSCF may be integrated together, and referred to as "I/S-CSCF" for short. The SBC and the P-CSCF may be integrated together, and referred to as "SBC/P-CSCF" for short. The EPC may include a mobility management entity (MME), a packet data network gateway (PGW), a serving gateway (SGW), and the like. The P-GW and the S-GW may be integrated together, and may be briefly referred to as "S/P-GW". Moreover, in addition to the network elements shown in FIG. 1, the IMS domain may further include other network elements, which are not enumerated in detail in this disclosure.

The foregoing network elements are corresponding network elements in a wireless communications network in an existing solution, and are not described in detail herein, but are merely briefly described. For example, the S-CSCF may be used for user registration, authentication control, session routing, service trigger control, and maintaining of session state information. The I-CSCF may be used for assignment and query of an S-CSCF with which a user registers. The P-CSCF may be used as a proxy for signaling and a message. The HSS may be configured to store user subscription information and location information. The SBC may provide secure access and media processing. The TAS provides basic and supplementary multimedia telephony services. The MME is a core device on the EPC network. The S-GW may be configured to connect the IMS core network to a wireless network, and the P-GW may be configured to connect the IMS core network to an IP network.

The originating IMS domain network and the terminating IMS domain network each may further include a customized alerting tones (CAT) application server (AS), a media resource function (MRF) server, and the like. The CAT AS is configured to provide a function of playing audio and video media for the originating UE. Audio and video media data played for the originating UE is stored in the MRF server, and is provided by the MRF server for the originating UE. A media server described in the following embodiments of this disclosure may be a CAT AS, or may be a server in which a CAT AS and an MRF server or a CAT AS and another network element are co-located, or may be another multimedia server. Details are not described herein again.

It should be noted that the foregoing descriptions do not constitute a limitation on the architectural diagram of the system in embodiments of this disclosure, and the architectural diagram of the system in embodiments of this disclosure includes but is not limited to the system shown in FIG. 1.

It should be further noted that, the MRF server and the CAT AS corresponding to the originating UE may be the same as or different from the MRF server and the CAT AS corresponding to the terminating UE. The MRF server and the CAT AS described in the following embodiments of this disclosure may be the MRF server and the CAT AS on a terminating side, or may be the MRF server and the CAT AS on an originating side. The same applies to media servers on the originating side and the terminating side, and details are not described in the following implementations of this disclosure.

The following describes in detail the video media playing method in this disclosure based on the foregoing communications system.

Figure 2:
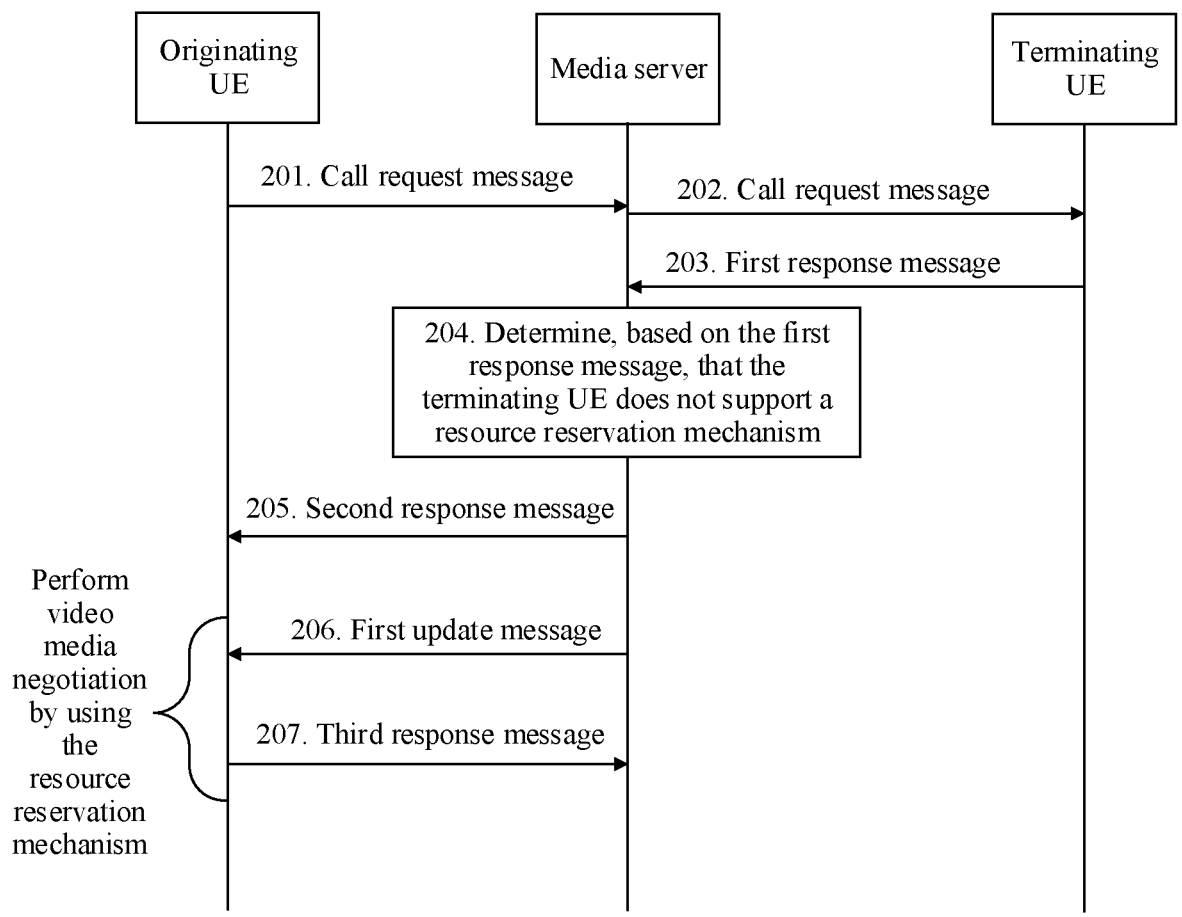
FIG. 2 is a schematic flowchart of a video media playing method according to this disclosure.

FIG. 2 is a schematic flowchart of a video media playing method according to this disclosure. The method is as follows.

201. Originating UE sends a call request message to a media server.

First, if the originating UE initiates a call to terminating UE, the originating UE may send a call request message to a media server corresponding to the terminating UE. Specifically, the call request message may be an INVITE message.

The call request message may include first session description protocol (SDP) information of the originating UE, and the first SDP information may include information about whether the originating UE supports precondition. The media server can determine, by using the call request message, whether the originating UE supports precondition. For example, if the first SDP information includes a field including "precondition", it indicates that the originating UE supports precondition; or if the first SDP information does not include "precondition", it indicates that the originating UE does not support precondition.

The call request message may further include an identifier of the originating UE, so that the media server or the terminating UE identifies the originating UE that initiates the call request.

"precondition" in this disclosure is a resource reservation mechanism/procedure, and a precondition procedure includes performing resource reservation and sending indication information to a peer after completing resource reservation. Specifically, resource reservation includes reserving a matched bandwidth, an available frequency band, a corresponding priority, and the like. For example, if originating UE supports precondition, then a precondition procedure includes: after completing resource reservation, the media server notifies the originating UE that the media server has completed resource reservation; and after completing resource reservation, the originating UE also notifies the media server that the originating UE has completed resource reservation.

202. The media server sends a call request message to terminating UE.

After the media server receives the call request message sent by the originating UE, the media server may forward the call request message to the terminating UE.

The call request message that is sent by the originating UE and that is received by the media server may be the same as or different from the call request message sent by the media server to the terminating UE. For example, the call request message sent by the media server to the terminating UE and the call request message that is sent by the originating UE and that is received by the media server may have a same data format or different data formats.

203. The terminating UE sends a first response message to the media server.

After the terminating UE receives the call request message sent by the media server, the terminating UE generates the first response message for the call request message, and sends the first response message to the media server.

204. The media server determines, based on the first response message, that the terminating UE does not support a resource reservation mechanism/procedure.

After receiving the first response message sent by the terminating UE, the media server can determine, based on the first response message, that the terminating UE does not support precondition.

Specifically, after receiving the first response message, the media server can determine, based on data included in the first response message, whether the terminating UE supports precondition. For example, if the first response message includes the field including "precondition", it indicates that the terminating UE supports precondition; or if the first response message does not include the field including "precondition", it indicates that the terminating UE does not support precondition. Alternatively, after receiving the first response message, the media server can determine that the terminating UE does not support precondition. For example, if the first response message is a 180 message, that is, a message indicating that the terminating UE rung, and before receiving the 180 message, the media server does not receive a 183 message from the terminating UE, the media server can determine that the terminating UE does not support precondition.

In a possible implementation, after receiving the first response message sent by the terminating UE, the media server may perform resource reservation for video media, and reserve a network resource for the video media, so that media stream data of the video media can be transmitted to the originating UE by using the reserved network resource, and the originating UE can play the video media, thereby improving user experience.

205. The media server sends a second response message to the originating UE.

After the media server receives the first response message sent by the terminating UE, the media server sends the second response message to the originating UE. The second response message is used to respond to the first SDP information included in the call request message.

Specifically, the second response message may include second SDP information of the media server. The second SDP information is used to respond to the first SDP information included in the call request message.

The second response message indicates that the terminating UE does not support precondition. Specifically, because the terminating UE does not support precondition, the second response message does not include the field including "precondition" or a field related to support for precondition, so that the originating UE learns, based on the second response message, that the terminating UE does not support precondition.

The second response message may be a 183 message, and the 183 message includes the second SDP information. The second SDP information may include media capability information (for example, audio media information) of the media server, an interface of the media server, an access address, and the like. Alternatively, the second SDP information is fictitious SDP information. The second SDP information is used to respond to the first SDP information included in the call request message. For example, if the call request message includes audio and video media information, the 183 message also includes the audio and video media information or includes only the audio media information, so as to respond to the audio and video media information in the call request message. If the call request includes only the audio media information without the video media information, the 183 message also includes only the audio media information without the video media information. In addition, the 183 message does not include the field including "precondition", to indicate that the terminating UE does not support precondition.

After sending the second response message to the originating UE, the media server performs video media negotiation with the originating UE through a precondition procedure. Specifically, the step in which the media server performs video media negotiation with the originating UE may include the following steps.

206. The media server sends a first update message to the originating UE.

After sending the second response message to the originating UE, the media server continues to send the first update message to the originating UE. The first update message includes third SDP information of the video media, so as to implement video media negotiation with the originating UE.

After receiving the first update message, the originating UE may obtain the SDP information of the video media based on the first update message, and may start precondition based on the SDP information of the video media to perform resource reservation.

Specifically, the video media in this disclosure may include a video ring back tone, a video advertisement, and the like.

Specifically, the first update message may be an UPDATE message. The first update message may include the SDP information of the video media, and the first update message is used to perform video media negotiation with the originating UE. For example, the first update message may include audio description information of the video media and video description information of the video media, a coding/decoding scheme of the video media, and the like.

Optionally, in a possible implementation, a header field of the first update message includes indication information indicating the originating UE to perform resource reservation. For example, a "Supported" header field of the first update message may include "precondition" to notify the originating UE to start precondition. In addition, the first update message includes the third SDP information of the video media, and may further include a QoS parameter of the video media. The QoS parameter may include a data transmission priority, a quality of service class identifier (QoS class identifier, QCI), and the like of the video media. The QoS parameter may be used by the media server or the originating UE to determine the network resource reserved for the video media. For example, the media server or the originating UE can determine, based on the QoS parameter, information such as a bandwidth and a frequency band of the network resource reserved for the video media. A higher QoS level of the video media indicates a larger bandwidth of the network resource reserved for the video media, and a lower QoS level of the video media indicates a smaller bandwidth of the network resource reserved for the video media. The QoS parameter further includes a resource reservation status. For example, if the media server has completed resource reservation but the originating UE has not, the QoS parameter includes indication information indicating that a local end (the media server) has completed resource reservation but a remote end (the originating UE) has not.

207. The originating UE sends a third response message to the media server.

After receiving the first update message sent by the media server, the originating UE obtains the SDP information of the video media from the first update message, starts a precondition procedure, and generates the third response message based on the first update message and its own multimedia capability. The third response message includes a result of video media negotiation between the originating UE and the media server. The originating UE sends the third response message to the media server, so that the negotiation between the media server and the originating UE for the video media can be completed. Specifically, the third response message may be a 200 OK message.

The originating UE determines negotiation information of the video media based on the audio description information and the video description information that are included in the first update message, and starts the precondition procedure.

Therefore, in this implementation of this disclosure, after receiving the call request message from the originating UE, the media server may forward the call request message to the terminating UE. The call request message includes the first SDP information of the originating UE. The media server receives the first response message returned by the terminating UE. The media server can determine, based on the first response message, that the terminating UE does not support precondition. Then, the media server sends, to the originating UE, the second response message used to respond to the first SDP information of the originating UE. In addition, video media negotiation with the originating UE is performed in a precondition procedure. In this way, the originating UE completes resource reservation for the video media, so that the originating UE can play the video media by using the reserved resource, thereby improving user experience. Specifically, the media server sends, to the originating UE, the first update message that includes the indication information indicating the originating UE to perform resource reservation and includes the SDP information of the video media, so as to perform video media negotiation with the originating UE. The media server receives the third response message sent by the originating UE. The third response message includes the result of video media negotiation between the originating UE and the media server. Therefore, even if the terminating UE does not support precondition, the media server may perform video media negotiation with the originating UE through a precondition procedure, and the originating UE and the media server are enabled to perform resource reservation. In this way, the video media can be played after the originating UE and the media server complete resource reservation, thereby ensuring normal playing of the video media and improving user experience.

Optionally, in a possible implementation, after step 206 or step 207, the originating UE may reserve a network resource for the video media. The network resource is used to transmit the media stream data of the video media, thereby ensuring smooth playing of the video media.

Optionally, in a possible implementation, after the originating UE completes resource reservation for the video media, the originating UE further sends a second update message to the media server. The second update message indicates that the originating UE has completed resource reservation for the video media. Alternatively, the second update message may further include specific information of the network resource reserved by the originating UE, for example, bandwidth information or frequency band information. The second update message may further include a QoS parameter. The QoS parameter further includes a resource reservation status. For example, if the originating UE has completed resource reservation, but it cannot be determined whether the media server has completed resource reservation, the QoS parameter includes indication information, indicating that a local end (the originating UE) has completed resource reservation but a remote end (the media server) has not.

The second update message may be specifically an UPDATE message. Therefore, the media server receives the second update message sent by the originating UE, and determines that the originating UE has completed resource reservation for the video media, or may further obtain the specific information of the network resource reserved by the originating UE, for example, interface information, address information, and the bandwidth information. Therefore, in this implementation of this disclosure, after completing resource reservation for the video media, the originating UE may notify the media server that the originating UE has completed resource reservation, so that the media server transmits a media stream of the video media after determining that the originating UE has completed the resource reservation. Further, the media server may further transmit the media stream data of the video media based on the network resource reserved by the originating UE, so that the originating UE can play the video media, thereby improving user experience.

Optionally, in a possible implementation, the third response message indicates that the originating UE has completed resource reservation for the video media. In this way, the media server may learn, by using the third response message, that the originating UE has completed resource reservation for the video media, and completed the precondition procedure.

Optionally, in a possible implementation, after receiving the second update message sent by the originating UE, the media server determines that the originating UE has completed resource reservation. Further, after the media server determines that the media server has completed resource reservation, the media server further sends a fourth response message to the originating UE. The fourth response message indicates that the media server has completed resource reservation. The second update message may further include a QoS parameter, and the QoS further includes a resource reservation status. For example, if the originating UE has completed resource reservation, and the media server has also completed resource reservation, the QoS parameter includes indication information, indicating that a local end (the media server) has completed resource reservation, and a remote end (the originating UE) has also completed resource reservation, that is, both parties succeed in resource reservation.

The fourth response message may be specifically a 200 OK message. In this implementation of this disclosure, the media server further sends the fourth response message to the originating UE to notify the originating UE that the media server has completed resource reservation. In this way, the originating UE can successfully receive the media stream data of the video media subsequently.

Optionally, in a possible implementation, after the media server receives the second update message sent by the originating UE, or after the media server sends the fourth response message to the originating UE, the media server sends the media stream data of the video media to the originating UE, so that the originating UE plays the media stream data of the video media. Specifically, if the media server does not store the media data of the video media, the media server may send indication information to an MRF server, to indicate the MRF server to send the media data of the video media to the originating UE in a data stream manner, so that the originating UE can play the video media, thereby improving user experience.

Optionally, in a possible implementation, the media server sends the first update message to the originating UE after determining that the media server has completed resource reservation. The first update message indicates that the media server has completed resource reservation. For example, the first update message includes a QoS parameter, and the QoS parameter includes a resource reservation status. Specifically, the QoS parameter includes indication information, indicating that a local end (the media server) has completed resource reservation but a remote end (the originating UE) has not. In addition, after receiving the second update message sent by the originating UE, the media server determines that the originating UE has completed resource reservation, and then the media server sends a fourth response message to the originating UE. The second update message includes a QoS parameter. Specifically, the QoS parameter includes indication information, indicating that a local end (the originating UE) has completed resource reservation, and a remote end (the media server) has completed resource reservation, that is, both parties succeed in resource reservation. The fourth response message is used to respond to the second update message. Therefore, the media server may notify, by using the first update message, the originating UE that the media server has completed resource reservation, and does not need to separately send indication information, thereby reducing signaling overheads.

The foregoing describes a process of the video media playing method provided in this disclosure. The following further describes the video media playing method provided in this disclosure by using specific application scenarios as examples.

For example, the video media playing method provided in this disclosure may be divided into a plurality of scenarios. One scenario may include a case in which the terminating UE replies with a 183 message, and another scenario may be a case in which the terminating UE does not reply with a 183 message. The following separately provides descriptions by using examples.

Scenario 1: The terminating UE does not reply with a 183 message.

Figure 3:
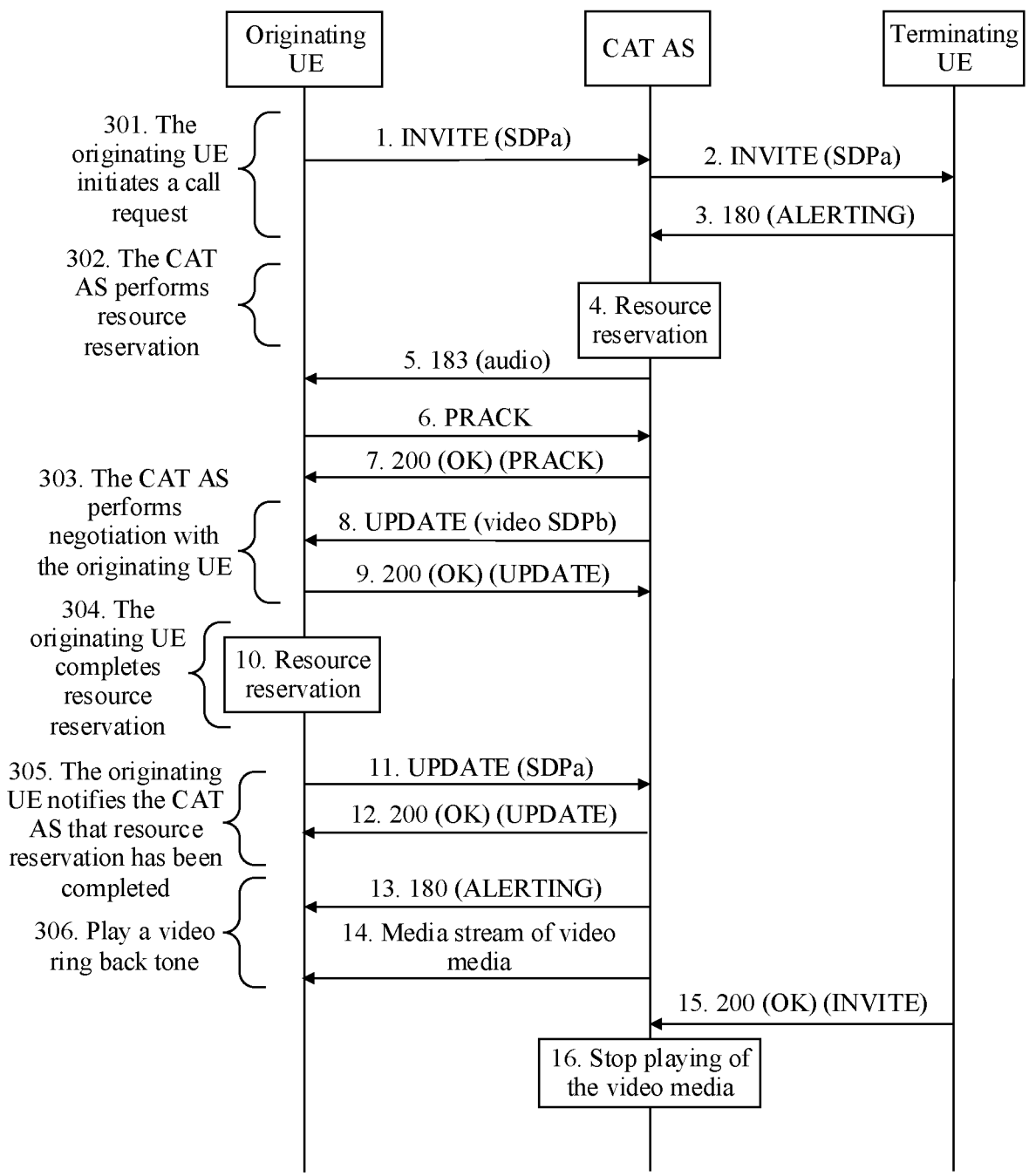
FIG. 3 is a schematic flowchart of another video media playing method according to this disclosure.

FIG. 3 is a schematic flowchart of another video media playing method according to this disclosure. The method is as follows.

301. The originating UE initiates a call request.

First, the originating UE may initiate a call request to the terminating UE. For example, subscriber A may initiate, by using the originating UE, a call to the terminating UE used by subscriber B, so that the originating UE initiates a call request to the terminating UE.

In this embodiment of this disclosure, a CAT AS may replace the foregoing media server. The CAT AS is merely used for example description herein. In addition, in this implementation of this disclosure, messages received or sent by the CAT AS may all be forwarded or processed by using a CSCF network element. Details are not described in the following embodiments of this disclosure. For example, if the originating UE sends an INVITE message to the CAT AS, the originating UE may send the INVITE message to the CSCF network element, and the CSCF network element may process the INVITE message and then send the INVITE message to the CAT AS, or the CSCF directly sends the INVITE message to the CAT AS.

For example, step 301 may specifically include the following steps.

1. The originating UE sends the call request (the INVITE message) to the CAT AS. The INVITE message includes a subscriber identifier of the terminating UE and further includes SDP information of the originating UE. In addition, the INVITE message may further include information about whether the originating UE supports precondition. For example, if the INVITE message includes a field including "precondition", it indicates that the originating UE supports precondition; or if the INVITE message does not include a field including "precondition", it indicates that the originating UE does not support precondition.

2. The CAT AS forwards the INVITE message to the terminating UE. The INVITE message includes precondition capability information of the originating UE. If the INVITE message includes the field including "precondition", it indicates that the originating UE supports precondition, and the CAT AS determines that the originating UE supports precondition.

3. The terminating UE sends a first response message, that is, a 180 message, to the CAT AS. The 180 message indicates that the terminating UE has rung. After receiving the 180 message, the CAT AS can determine, based on the 180 message, that the terminating UE has rung, and the CAT AS can continue to perform a subsequent step.

In this implementation of this disclosure, before receiving the 180 message sent by the terminating UE, if the CAT AS does not receive a 183 message from the terminating UE, the CAT AS can determine that the terminating UE does not support precondition.

302. The CAT AS performs resource reservation.

After the CAT AS determines that the terminating UE has rung, the CAT AS may perform resource reservation, that is, reserve a network resource for video media, as shown in step 4 in FIG. 3.

Specifically, the CAT AS may reserve a corresponding network resource for the video media based on a QoS parameter of the video media, including reserving a bandwidth of a preset size, a preset frequency band, a priority, a preset service level, or the like for the video media.

In addition, after step 302, the method may further include the following steps.

5. The CAT AS sends a 183 message to the originating UE. The 183 message is constructed by the CAT AS. The 183 message may include SDP information of the CAT AS, or the 183 message may include fictitious SDP information. The SDP information included in the 183 message is used to respond to the SDP information of the originating UE in the INVITE message sent by the originating UE in step 1. Specifically, if the 183 message includes the SDP information of the CAT AS, the SDP information of the CAT AS includes audio and video media information. The audio and video media information is used to respond to audio and video media information in the SDP information of the originating UE in the INVITE message. The audio and video media information included in the 183 message may be audio and video-related data of the video media, and the 183 message does not include the field including "precondition".

The SDP information in the 183 message may further include media capability information of the CAT AS, for example, information about audio supported by the CAT AS, an available interface of the CAT AS, or an address of the CAT AS.

For example, content included in the 183 message is as follows:

Neither the "Require" field of the 183 message nor the "Supported" header field of the 183 message includes "precondition". Therefore, the 183 message indicates that the terminating UE does not support precondition, that is, notifies the originating UE that the terminating UE does not support precondition.

It should be noted that, an execution sequence of step 4 and step 5 is not limited in this disclosure. Step 4 may be performed first, or step 5 may be performed first. Specifically, the execution sequence may be adjusted based on an actual application scenario. This is not limited herein.

6. The originating UE sends a PRACK message to the CAT AS. The PRACK message is used to respond to the 183 message, to indicate that the originating UE has received the 183 message.

7. The CAT AS sends a 200 OK message to the originating UE. The 200 OK message is used to respond to the PRACK message, and indicates that the CAT AS has received the PRACK message.

Therefore, the CAT AS may construct a 183 message to respond to the INVITE message of the originating UE. In this embodiment of this disclosure, precondition for the video media may be started without changing a processing procedure of the originating UE.

303. The CAT AS performs video media negotiation with the originating UE through a precondition procedure.

After receiving the 180 message sent by the terminating UE, the CAT AS may perform video media negotiation with the originating UE, so as to negotiate with the originating UE on media information of the video media to be played.

For example, step 303 may specifically include the following steps.

8. The CAT AS sends a first update message, that is, an UPDATE message, to the originating UE. The UPDATE message includes SDP information of the video media. The SDP information may specifically include audio description information of the video media and video description information of the video media, so as to implement negotiation between the CAT AS and the originating UE for the video media through a precondition procedure. A header field of the

```
SIP/2.0 183 Session Progress
  Via: SIP/2.0/UDP scscf2.home2.net;branch=z9hG4bK764z87.1,        SIP/2.0/UDP
scscf1.home1.net;branch=z9hG4bK332b23.1,                          SIP/2.0/UDP
pcscf1.visited1.net;branch=z9hG4bK240f34.1,                       SIP/2.0/UDP
[5555::aaa:bbb:ccc:ddd]:1357;comp=sigcomp;branch=z9hG4bKnashds7
  From:
  To:
  Call-ID:
  Cseq:
  Require: 100rel, early-session
  Recv-Info: dtmfInfo
  RSeq: 9022
  Contact:<sip:cat-as.home1.net>;+g.3gpp.icsi_ref="urn%3Aurn-7%3gpp-
service.ims.icsi.mmtel"
  Content-Type: application/sdp
  Content-Disposition: early-session
  Content-Length: (...)
  v=0
  o=- 2987933616 2987933616 IN IP6 5555::eee:fff:aaa:bbb
  s=-
  c=IN IP6 5555::ccc:aaa:bbb:acc
  t=0 0
  m=audio 3456 RTP/AVP 97
  b=AS:25.4
  a=rtpmap:97 AMR
  a=fmtp:97 mode-set=0,2,5,7; maxframes
  a=content:g.3gpp.cat
```

UPDATE message may include "precondition", indicating the UE to start a precondition procedure. In addition, the SDP information of the video media may further include a QoS parameter of the video media, so that the originating UE can perform resource reservation based on the QoS parameter. It can be understood that, the CAT AS may start the precondition procedure of the originating UE by using the UPDATE message, so that the CAT AS performs video media negotiation with the originating UE in a precondition manner. In this way, both the originating UE and the CAT AS can reserve network resources for the video media.

Specifically, the SDP information of the video media may further include the media information of the video media, for example, an available coding scheme, decoding scheme, transmission interface, access address, and the like of the video media that are provided by the CAT AS, so as to implement media information negotiation with the originating UE for the video media.

In addition, if the originating UE sends an UPDATE message to the CAT AS for video media negotiation, the UPDATE message also needs to include the field including "precondition" and the corresponding QoS parameter.

9. The originating UE sends a 200 OK message to the CAT AS. The 200 OK message is used to respond to the UPDATE message sent by the CAT AS to the originating UE. The 200 OK message includes a result of video media negotiation between the originating UE and the CAT AS. Specifically, the 200 OK message may include some SDP information of the CAT AS. For example, if the SDP information sent by the CAT AS to the originating UE includes information about a plurality of interfaces available on the CAT AS, a plurality of pieces of bandwidth information, a plurality of pieces of frequency band information, or the like, the 200 OK message returned by the originating UE may include information about one interface in the plurality of interfaces supported by the CAT AS, one piece of bandwidth information, one piece of channel information, and the like, so as to implement video media negotiation with the CAT AS.

304. The originating UE completes resource reservation.

After the originating UE receives the UPDATE message, the originating UE may perform resource reservation for the video media, to ensure that media stream data of the video media can be normally transmitted. It should be noted that, an execution sequence of step 9 and step 10 is not limited in this disclosure. Step 9 may be performed first, step 10 may be performed first, or step 9 and step 10 may be performed simultaneously. Specifically, the execution sequence may be adjusted based on an actual application scenario.

In step 10 shown in FIG. 3, the originating UE may reserve a matched network resource for the video media based on the SDP information included in the first update message in step 8. For example, the originating UE may reserve a sufficient bandwidth, a preset frequency band, a port, and the like for the video media based on a QoS level, the audio description information of the video media, and the video description information of the video media, so that the originating UE can successfully receive the media stream data of the video media, and successfully play the video media, thereby improving user experience.

It should be understood that, in this implementation of this disclosure, the network resource reserved by the CAT AS for the video media corresponds to the network resource reserved by the originating UE for the video media. For example, if a frequency band reserved by the CAT AS for the video media is 850 MHz to 950 MHz, a frequency band reserved by the originating UE for the video media is also 850 MHz to 950 MHz.

305. The originating UE notifies the CAT AS that resource reservation has been completed.

After the originating UE completes resource reservation for the video media, the originating UE may notify the CAT AS, so that the CAT AS transmits the media stream data of the video media to the originating UE.

For example, step 305 is specifically as follows.
11. The originating UE sends an UPDATE message to the CAT AS. The UPDATE message includes the SDP information of the originating UE, and the SDP information indicates that the originating UE has completed resource reservation.
12. After determining that the CAT AS has completed resource reservation, the CAT AS sends a 200 OK message, that is, a fourth response message, to the originating UE. The 200 OK message is used to respond to the UPDATE message in step 11, and indicates that the CAT AS has completed resource reservation.

Therefore, in this implementation of this disclosure, after completing resource reservation for the video media, the originating UE further notifies the CAT AS, so that the CAT AS can transmit the media stream data of the video media to the originating UE.

306. Play video media.

After the CAT AS completes video media negotiation with the originating UE, and both the CAT AS and the originating UE reserve the matched network resource for the video media, the CAT AS may start a video media playing process.

For example, step 306 is as follows.
13. The CAT AS sends a 180 message to the originating UE. The 180 message indicates that the terminating UE has rung.
14. The CAT AS sends the media data of the video media to the originating UE in a form of a media stream, that is, the CAT AS sends the media stream data of the video media to the originating UE. It should be understood that, the media stream data of the video media may be sent by the CAT AS to the originating UE, or may be sent by an MRF server to the originating UE upon an indication of the CAT AS. This is not limited in this disclosure.

In addition, after the originating UE successfully plays the video media, the method further includes the following steps.
15. The terminating UE sends a 200 OK message to the CAT AS. The 200 OK message is used to respond to the INVITE message in step 2, and indicates that the terminating UE is already off-hook.
16. The CAT AS stops playing of the video media. Specifically, after determining that the terminating UE is already off-hook, the CAT AS may stop transmitting the media stream data of the video media to the originating UE, so that the originating UE stops playing the video media. The CAT AS may further send off-hook indication information to the originating UE, to indicate that the terminating UE is already off-hook, so as to perform a subsequent procedure.

In this implementation of this disclosure, if the terminating UE replies with a 180 message and does not reply with a 183 message, the CAT AS determines that the terminating UE does not support precondition. The CAT AS constructs a 183 message to complete a response to the INVITE message of the originating UE, and subsequently sends the UPDATE message to perform video media negotiation with the originating UE. That is, the CAT AS and the originating UE may perform video media negotiation through the precondition procedure, so that both the originating UE and the CAT AS can reserve a network resource for the video media. In this way, the originating UE can play the video media even if the terminating UE does not support precondition, thereby improving user experience.

Scenario 2: The terminating UE replies with a 183 message.

In scenario 2, the media server receives a call request message from the originating UE, where the call request message includes first session description protocol (SDP) information of the originating UE; the media server receives a first response message returned by the terminating user equipment (UE), where the first response message may be a first session progress message; and the media server determines, based on the first session progress message, that the terminating UE does not support a resource reservation mechanism/procedure. Then, the media server sends a second response message to the originating UE, where the second response message may be a second session progress message, the second session progress message includes SDP information of the terminating UE, the second session progress message is obtained by the media server based on the first session progress message, and the SDP information of the terminating UE is used to respond to the first SDP information. The media server completes video media negotiation with the originating UE through a precondition procedure. That is, different from FIG. 2 and FIG. 3, in this embodiment of this disclosure, the first response message is a session progress message (that is, a 183 message), and the 183 message includes the SDP information of the terminating UE. Then, the media server determines, based on the SDP information of the terminating UE, that the terminating UE does not support precondition. In addition, after the media server receives the first session progress message, the media server may further receive a 180 message to indicate that the terminating UE has rung.

Figure 4:
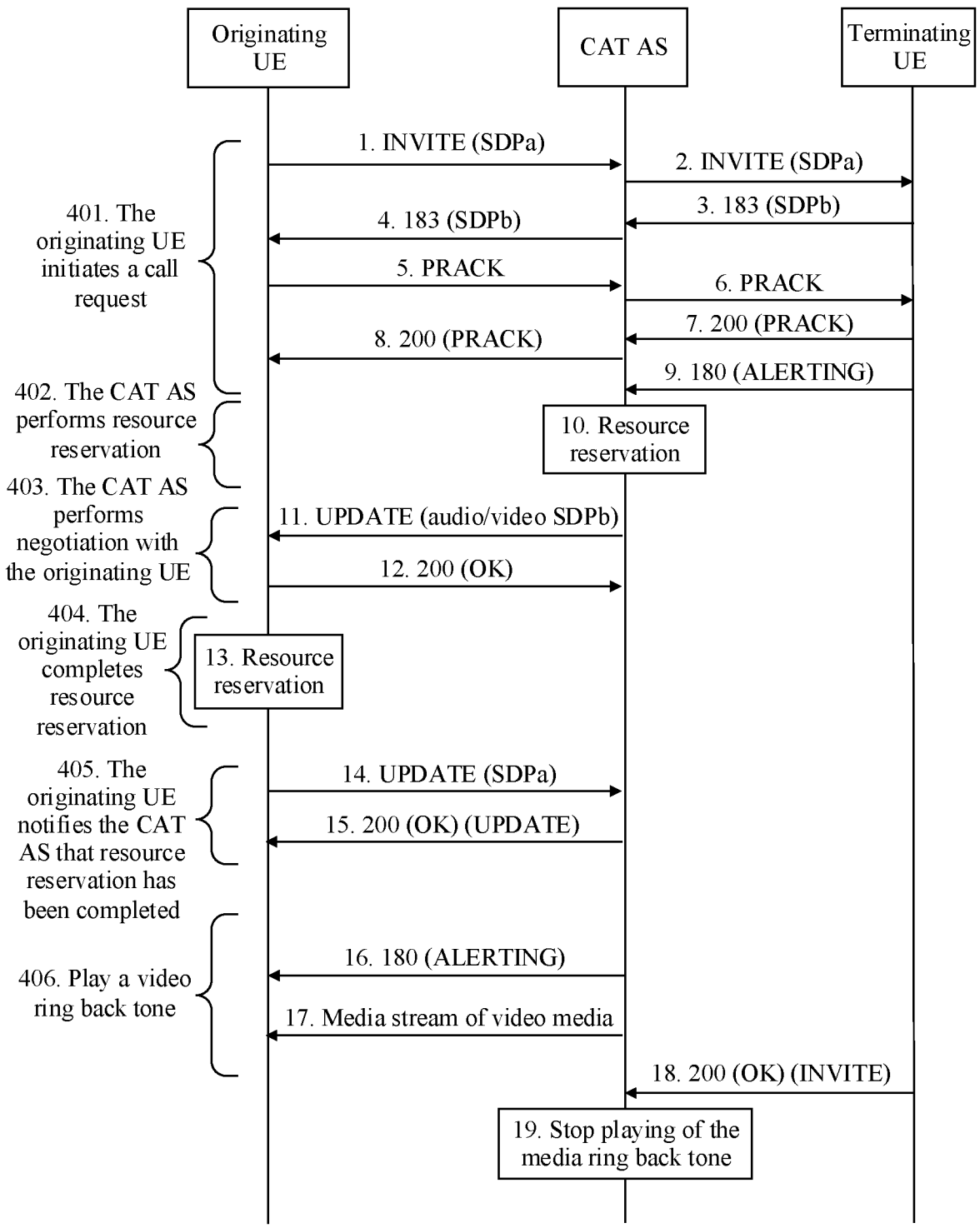
FIG. 4 is a schematic flowchart of another video media playing method according to this disclosure.

For example, FIG. 4 is a schematic flowchart of another video media playing method according to this disclosure. The method is as follows.

401. The originating UE initiates a call request.

First, the originating UE may initiate a call request to the terminating UE.

For example, step 401 may specifically include the following steps.

1. The originating UE sends an INVITE message to the CAT AS.
2. The CAT AS sends the INVITE message to the terminating UE.

Step 1 and step 2 are similar to step 1 and step 2 in FIG. 3, and details are not described herein again.

3. The terminating UE sends a 183 message to the CAT AS. After receiving the INVITE message sent by the CAT AS, the terminating UE sends the 183 message to the CAT AS. The 183 message includes SDP information of the terminating UE, and the 183 message indicates a precondition capability of the terminating UE. For example, if the 183 message does not include a field including "Require: precondition", the CAT AS can determine that the terminating UE does not support precondition. In this implementation of this disclosure, because the terminating UE does not support precondition, the 183 message does not include a field including "precondition".

4. The CAT AS forwards the 183 message to the originating UE. For the 183 message, refer to the description in step 3. The 183 message may indicate that the terminating UE does not support precondition, so that the originating UE learns that the terminating UE does not support precondition.

5. The originating UE sends a PRACK message to the CAT AS. The PRACK message is used to respond to the INVITE message sent by the CAT AS, and indicates that the originating UE has received the INVITE message.

6. The CAT AS sends the PRACK message to the terminating UE.

7. The terminating UE sends a 200 OK message to the CAT AS. The 200 OK message is used to respond to the PRACK message sent by the CAT AS, and indicates that the terminating UE has received the PRACK message.

8. The CAT AS sends a 200 OK message to the originating UE. After receiving the 200 OK message, the originating UE can determine that the terminating UE has received the PRACK message.

9. The terminating UE sends a 180 message to the CAT AS. The 180 message indicates that the terminating UE has rung. After receiving the 180 message, the CAT AS can determine, based on the 180 message, that the terminating UE has rung, and the CAT AS can continue to perform a subsequent step.

In this implementation of this disclosure, the CAT AS can determine, by using the 183 message returned by the terminating UE, that the terminating UE does not support precondition.

402. The CAT AS performs resource reservation.

Step 402 (that is, step 10 in FIG. 4) in this embodiment of this disclosure is similar to the foregoing step 302, and details are not described herein again.

403. The CAT AS performs video media negotiation with the originating UE.

After receiving the 180 message sent by the terminating UE, the CAT AS may perform video media negotiation with the originating UE, so as to negotiate with the originating UE on media information of the video media to be played.

For example, step 403 may specifically include the following steps.

11. The CAT AS sends an UPDATE message to the originating UE. For the UPDATE message, refer to the description of step 8 in FIG. 3.

For example, content included in the UPDATE message is as follows:

```
UPDATE sip:user1_public1@home1.net;gr=urn:uuid:f81d4fae-7dec-11d0-a765-
00a0c91e6bf6 SIP/2.0
  Via: SIP/2.0/UDP [5555::ccc:aaa:abc:abc]:8805;branch=z9hG4bK182D87.1
  Max-Forwards: 70
  Route: <sip:scscf1.home1.net;lr>, <sip:pcscf1.visited1.net;lr>
  From: <tel:+1-212-555-2222>;tag=2236
  To: <sip:user1_public1@home1.net>;tag=171828
```

```
Call-ID:
Cseq: 12814111 UPDATE
Supported: precondition
Contact: <sip:user2_public1@home2.net;gr=urn:uuid:2ad8950e-48a5-4a74-8d99-
ad76cc7fc74>+g.3gpp.icsi-ref="urn%3Aurn-7%3gpp-service.ims.icsi.mmtel"
Content-Type: application/sdp
Content-Length: (...)
v=0
o=- 29879336156 29879336156 IN IP6 5555::ccc:aaa:abc:abc
s=-
c=IN IP6 5555::ccc:aaa:abc:abc
t=0 0
m=audio 49170 RTP/AVPF 97 96
a=acfg:1 t=1
b=AS:25.4
   a=curr:qos local sendrecv//Current resource reservation status: A local end (the media
server) has completed resource reservation.
   a=curr:qos remote none//Current resource reservation status: A remote end (the
originating UE) has completed resource reservation.
   a=des:qos mandatory local sendrecv//Expected resource reservation status: The local
end (the media server) has completed resource reservation.
   a=des:qos optional remote sendrecv//Expected resource reservation status: The remote
end (the originating UE) has completed resource reservation.
   a=conf:qos remote sendrecv
   a=rtpmap:97 AMR
   a=fmtp:97 mode-set=0,2,5,7; maxframes
   a=rtpmap:96 telephone-event
   a=content:g.3gpp.cat
   m=video 51372 RTP/AVPF 98
   a=acfg:1 t=1
   b=AS:75
   a=curr:qos local sendrecv
   a=curr:qos remote none
   a=des:qos mandatory local sendrecv
   a=des:qos optional remote sendrecv
   a=conf:qos remote sendrecv
   a=rtpmap:98 H263
   a=fmtp:98 profile-level-id=0
   a=content:g.3gpp.cat
```

The "Supported" header field includes "precondition", indicating that the CAT AS can perform video media negotiation with the originating UE through a precondition procedure. The audio field includes audio description information of the video media, and the video field includes video description information of the video media. In addition, the UPDATE message includes indication information indicating that the CAT AS has completed resource reservation, for example, a=curr:qos local sendrecv in the UPDATE message.

Therefore, after receiving the UPDATE message sent by the CAT AS, the terminating UE may perform video media negotiation with the CAT AS through a precondition procedure, so as to reserve a resource for the video media, and enable the originating UE to play the video media, thereby improving user experience.

12. The originating UE sends a 200 OK message to the CAT AS. For the 200 OK message, refer to the related description of step 9 in FIG. 3.
404. The originating UE completes resource reservation.
405. The originating UE notifies the CAT AS that resource reservation has been completed.
406. Play video media.

It should be noted that, steps 404 to 406 in this embodiment of this disclosure are similar to steps 304 to 306. For details, refer to the detailed descriptions in the foregoing 304 to 306. In other words, steps 13 to 19 in FIG. 4 of this disclosure are similar to steps 10 to 16 in FIG. 3. Details are not described herein again.

In this implementation of this disclosure, the CAT AS can determine, based on the 183 message returned by the terminating UE, that the terminating UE does not support precondition, and perform video media negotiation in the precondition procedure with the originating UE by using the UPDATE message, so that both the CAT AS and the originating UE perform resource reservation for the video media. In this way, the media stream data of the video media can be transmitted to the originating UE, so that the originating UE can play the video media in a scenario in which the terminating UE does not support precondition. Therefore, the originating UE can play the video media regardless of whether the terminating UE supports precondition, thereby improving user experience.

The foregoing describes in detail the method provided in this disclosure, and the following describes an apparatus provided in this disclosure based on FIG. 2 to FIG. 4.

Figure 5:
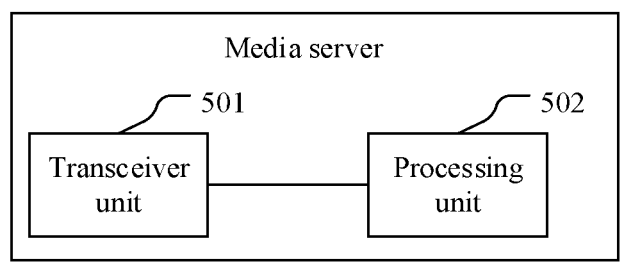
FIG. 5 is a schematic diagram of a structure of a media server according to this disclosure.

First, FIG. 5 is a schematic diagram of a structure of a media server according to this disclosure.

The media server may include a transceiver unit 501 and a processing unit 502.

The transceiver unit 501 is configured to receive a call request message from originating user equipment (UE), where the call request message includes first session description protocol (SDP) information of the originating UE.

The transceiver unit 501 is further configured to receive a first response message returned by terminating user equipment (user equipment UE).

The processing unit 502 is configured to determine, based on the first response message, that the terminating UE does not support resource reservation.

The transceiver unit 501 is further configured to send a second response message to the originating UE, where the second response message includes second SDP information, and the second SDP information is used to respond to the first SDP information.

The transceiver unit 501 is further configured to perform video media negotiation with the originating UE through a resource reservation mechanism/procedure.

Optionally, in a possible implementation,
the transceiver unit 501 is further configured to send a first update message to the originating UE, where the first update message includes third SDP information of video media; and
the transceiver unit 501 is further configured to receive a third response message sent by the originating UE, where the third response message includes a result of video media negotiation between the originating UE and the media server.

Optionally, in a possible implementation, the SDP information of the video media includes audio description information of the video media and video description information of the video media.

Optionally, in a possible implementation, a header field of the first update message includes indication information indicating the originating UE to perform resource reservation negotiation, and the SDP information of the video media includes a quality of service (QoS) parameter of the video media.

Optionally, in a possible implementation, the second response message indicates that the terminating UE does not support the resource reservation mechanism/procedure.

Optionally, in a possible implementation, the third response message indicates that the originating UE has completed resource reservation for the video media.

Optionally, in a possible implementation, the transceiver unit 501 is further configured to: after receiving the third response message sent by the originating UE, receive a second update message sent by the originating UE, where the second update message indicates that the originating UE has completed resource reservation for the video media.

Optionally, in a possible implementation, the transceiver unit 501 is further configured to: after receiving the second update message sent by the originating UE, send a fourth response message to the originating UE, where the fourth response message indicates that the media server has completed resource reservation.

Optionally, in a possible implementation, the transceiver unit 501 is further configured to: after receiving the second update message sent by the originating UE, send media stream data of the video media to the originating UE, to enable the originating UE to play the media stream data of the video media.

Optionally, in a possible implementation, the first response message is a 180 message, and that the processing unit 502 determines, based on the first response message, that the terminating UE does not support the resource reservation mechanism/procedure is performed based on determining that no 183 message is received from the terminating UE by the media server. If the first response message is a 180 message, and before receiving the 180 message, the transceiver unit 501 does not receive a 183 message from the terminating UE, the processing unit can determine that the terminating UE does not support the resource reservation mechanism/procedure.

Optionally, in a possible implementation, the processing unit 502 is further configured to: before the transceiver unit 501 sends the first update message to the originating UE, perform resource reservation for the video media. The first update message further includes information indicating that the media server has completed resource reservation.

Figure 6:
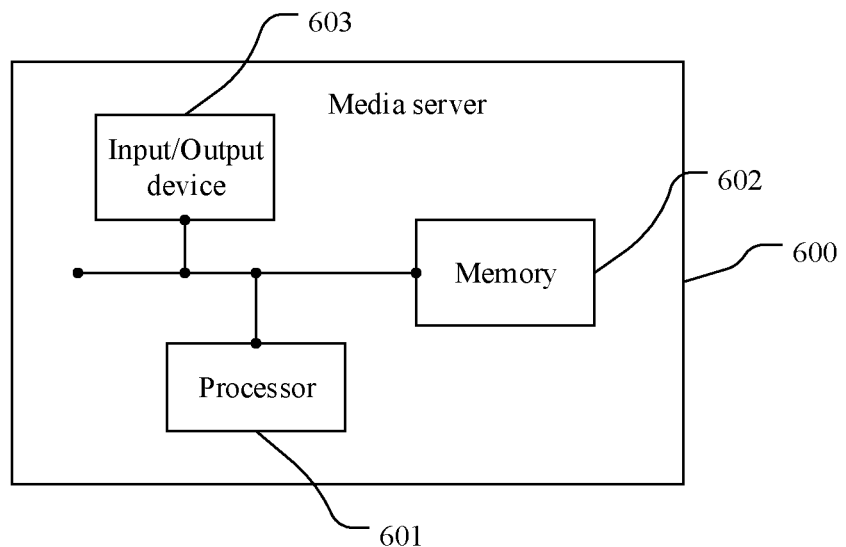
FIG. 6 is a schematic diagram of a structure of another media server according to this disclosure.

This disclosure further provides a media server 600. Referring to FIG. 6, in an embodiment of the media server in embodiments of this disclosure, the media server may be configured to perform the steps performed by the media server in any embodiment shown in FIG. 2 to FIG. 4. For details, refer to the related descriptions in the foregoing method embodiments.

The media server 600 includes a processor 601, a memory 602, and an input/output device 603.

In a possible implementation, the processor 601, the memory 602, and the input/output device 603 are separately connected to a bus, and the memory stores computer instructions.

The transceiver unit 501 in the foregoing embodiment may be the input/output device 603 in this embodiment. Therefore, implementation of the input/output device 603 is not described again.

The processing unit 502 in the foregoing embodiment may be the processor 601 in this embodiment. Therefore, implementation of the processor 601 is not described again.

This disclosure provides a chip system. The chip system includes a processor, configured to support a media server in implementing functions in the foregoing aspects, for example, sending or processing data and/or information in the foregoing method. In a possible design, the chip system further includes a memory. The memory is configured to store necessary program instructions and data. The chip system may include a chip, or may include a chip and another discrete component.

In another possible design, when the chip system is a chip in the media server, the chip includes a processing unit and a communications unit. The processing unit may be, for example, a processor, and the communications unit may be, for example, an input/output interface, a pin, a circuit, or the like. The processing unit may execute computer-executable instructions stored in a storage unit, so that the chip in the media server performs the method steps performed by the media server in any embodiment in FIG. 2 to FIG. 4. Optionally, the storage unit is a storage unit in the chip, for example, a register or a buffer. Alternatively, the storage unit may be a storage unit in the media server but outside the chip, for example, a read-only memory (read-only memory, ROM), another type of static storage device that can store static information and instructions, or a random access memory (random access memory, RAM).

An embodiment of this disclosure further provides a processor, configured to be coupled to a memory, and perform the method and function related to the media server in any one of the foregoing embodiments.

An embodiment of this disclosure further provides a computer-readable storage medium. A computer program is stored on the computer-readable storage medium. When the computer program is executed by a computer, a method related to the media server in any one of the foregoing method embodiments is implemented. Correspondingly, the computer may be the foregoing media server.

It should be understood that the processor in the media server, the chip system, or the like in the foregoing embodiments of this disclosure, or the processor provided in the foregoing embodiments of this disclosure may be a central processing unit (CPU), or may be another general-purpose processor, a digital signal processor (DSP), an application-specific integrated circuit (application-specific integrated circuit, ASIC), a field programmable gate array (FPGA) or another programmable logic component, a discrete gate or a transistor logic component, a discrete hardware assembly, or the like. The general-purpose processor may be a microprocessor, or the processor may be any conventional processor, or the like.

It should be further understood that, in the foregoing embodiments of this disclosure, there may be one or more processors in the media server, the chip system, and the like, and a quantity of processors may be adjusted based on an actual application scenario. This is merely an example for description, and is not limited herein. This is merely an example for description herein, and is not limited. There may be one or more memories in embodiments of this disclosure. The quantity may be adjusted based on an actual application scenario. This is merely an example for description herein, and is not limited.

It should be further understood that, in embodiments of this disclosure, the memory, the readable storage medium, or the like described in the media server, the chip system, and the like in the foregoing embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be further noted that, when the media server includes a processor (or a processing unit) and a memory, the processor in this disclosure may be integrated with the memory, or the processor and the memory may be connected by using an interface. This may be adjusted based on an actual application scenario, and is not limited.

An embodiment of this disclosure further provides a computer program or a computer program product including a computer program. When the computer program is executed on a computer, the computer is enabled to implement the method of the media server in any one of the foregoing method embodiments. Correspondingly, the computer may be the foregoing media server.

All or some of the foregoing embodiments in FIG. 2 to FIG. 4 may be implemented by using software, hardware, firmware, or any combination thereof. When the software is used for implementation, all or some of embodiments may be implemented in a form of a computer program product. The computer program product includes one or more computer instructions. When the computer program instructions are loaded and executed on a computer, all or some of the procedures or the functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the specification, claims, and the accompanying drawings of this disclosure, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this disclosure. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

Names of messages/frames/indication information, modules, units, or the like provided in embodiments of this disclosure are merely examples, and other names may be used provided that the messages/frames/indication information, modules, units, or the like have same functions.

The terms used in embodiments of this disclosure are merely for the purpose of illustrating specific embodiments, and are not intended to limit the present invention. The terms "a", "the", and "this" of singular forms used in embodiments and the appended claims of this disclosure are also intended to include plural forms, unless otherwise specified in a context clearly. In the descriptions of this disclosure, "/" represents an "or" relationship between associated objects unless otherwise specified. For example, A/B may represent A or B. The term "and/or" in this disclosure is merely an association relationship for describing associated objects, and represents that three relationships may exist. For example, A and/or B may represent the following three cases: Only A exists, both A and B exist, and only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A video media playing method, comprising:
receiving, by a media server, a call request message from an originating user equipment (UE), wherein the call request message indicates a terminating UE and comprises first session description protocol (SDP) information of the originating UE;
receiving, by the media server, a first response message returned by the terminating UE; and
determining, by the media server based on the first response message, that the terminating UE does not support a resource reservation procedure;
in response to the determining that the terminating UE does not support the resource reservation procedure, sending, by the media server, a second response message to the originating UE, wherein the second response message comprises second SDP information, and the second SDP information is used to respond to the first SDP information; and
performing, by the media server, video media negotiation with the originating UE through the resource reservation procedure.

2. The method according to claim 1, wherein the performing, by the media server, video media negotiation with the originating UE through the resource reservation procedure comprises:
sending, by the media server, a first update message to the originating UE, wherein the first update message comprises third SDP information of video media; and
receiving, by the media server, a third response message sent by the originating UE, wherein the third response message comprises a result of video media negotiation between the originating UE and the media server.

3. The method according to claim 2, wherein the third SDP information of the video media comprises audio description information of the video media and video description information of the video media.

4. The method according to claim 2, wherein:
a header field of the first update message comprises indication information indicating the originating UE to perform video media negotiation through the resource reservation procedure, or
wherein the third SDP information of the video media comprises a quality of service (QOS) parameter of the video media.

5. The method according to claim 2, wherein
the third response message indicates that the originating UE has completed resource reservation.

6. The method according to claim 2, wherein after the receiving, by the media server, a third response message sent by the originating UE, the method further comprises:
receiving, by the media server, a second update message sent by the originating UE, wherein the second update message indicates that the originating UE has completed resource reservation.

7. The method according to claim 6, wherein after the receiving, by the media server, a second update message sent by the originating UE, the method further comprises:
sending, by the media server, a fourth response message to the originating UE, wherein the fourth response message indicates that the media server has completed resource reservation.

8. The method according to claim 2, wherein before the sending, by the media server, a first update message to the originating UE, the method further comprises performing, by the media server, resource reservation for the video media; and the first update message indicates that the media server has completed resource reservation.

9. The method according to claim 7, wherein after the receiving, by the media server, a second update message sent by the originating UE, the method further comprises:
sending, by the media server, media stream data of the video media to the originating UE.

10. The method according to claim 1, wherein the first response message is a 180 message, and the determining, by the media server based on the first response message, that the terminating UE does not support the resource reservation procedure is performed based on determining that no 183 message is received from the terminating UE by the media server.

11. The method according to claim 1, wherein the second response message indicates that the terminating UE does not support the resource reservation procedure.

12. A media server, comprising a transceiver unit and a processing unit, wherein
the transceiver unit is configured to receive a call request message from an originating user equipment (UE), wherein the call request message indicates a terminating UE and comprises first session description protocol (SDP) information of the originating UE;
the transceiver unit is further configured to receive a first response message returned by the terminating UE;
the processing unit is configured to determine, based on the first response message, that the terminating UE does not support a resource reservation procedure;
the transceiver unit is further configured to send, in response to the determining that the terminating UE does not support the resource reservation procedure, a second response message to the originating UE, wherein the second response message comprises second SDP information, and the second SDP information is used to respond to the first SDP information; and
the transceiver unit is further configured to perform video media negotiation with the originating UE through the resource reservation procedure.

13. The media server according to claim 12, wherein the transceiver unit is specifically configured to:
send a first update message to the originating UE, wherein the first update message comprises third SDP information of video media; and
receive a third response message sent by the originating UE, wherein the third response message comprises a result of video media negotiation between the originating UE and the media server.

14. The media server according to claim 13, wherein the third SDP information of the video media comprises audio description information of the video media and video description information of the video media.

15. The media server according to claim 13, wherein a header field of the first update message comprises indication information indicating the originating UE to perform video media negotiation through the resource reservation procedure, or wherein the third SDP information of the video media comprises a quality of service (QOS) parameter of the video media.

16. The media server according to claim 13, wherein
the third response message indicates that the originating UE has completed resource reservation.

17. The media server according to claim 13, wherein
the transceiver unit is further configured to: after receiving the third response message sent by the originating UE, receive a second update message sent by the originating UE, wherein the second update message indicates that the originating UE has completed resource reservation.

18. A communications system, comprising a media server, wherein the media server is configured to:
receive a call request message from an originating user equipment (UE), wherein the call request message indicates a terminating UE and comprises first session description protocol (SDP) information of the originating UE;
receive a first response message returned by the terminating UE, and determine based on the first response message, that the terminating UE does not support a resource reservation procedure;
send, in response to the determining that the terminating UE does not support the resource reservation procedure, a second response message to the originating UE, wherein the second response message comprises second SDP information, and the second SDP information is used to respond to the first SDP information; and
perform video media negotiation with the originating UE through the resource reservation procedure.

19. The communications system according to claim 18, wherein the media server is further configured to:
send a first update message to the originating UE, wherein the first update message comprises third SDP information of video media; and
receive a third response message sent by the originating UE, wherein the third response message comprises a result of video media negotiation between the originating UE and the media server.

20. The communications system according to claim 19, wherein the third response message indicates that the originating UE has completed resource reservation.

* * * * *